Sept. 27, 1932.         A. E. GLANCY         1,879,800
OPHTHALMIC LENS
Filed Nov. 30, 1928
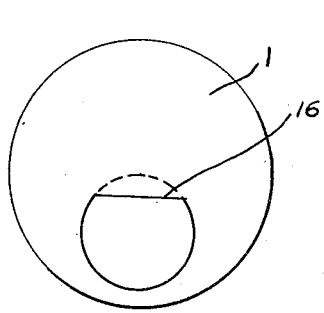
FIG X
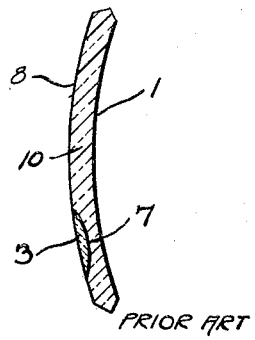
FIG I
PRIOR ART
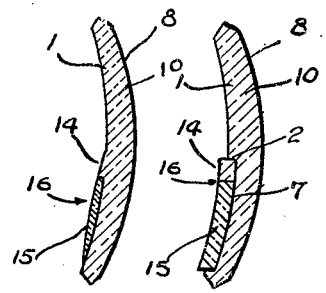
FIG XI   FIG XII
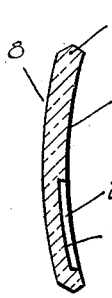
FIG II
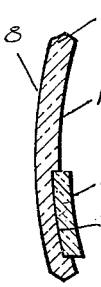
FIG III
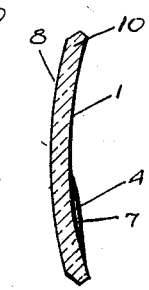
FIG IV
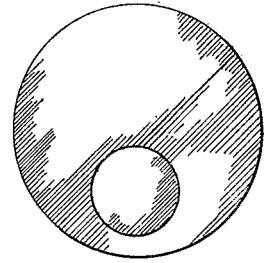
FIG V
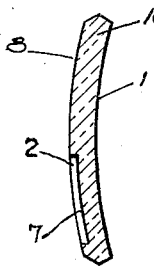
FIG VI
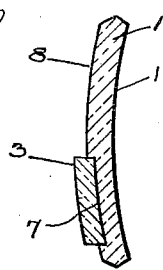
FIG VII
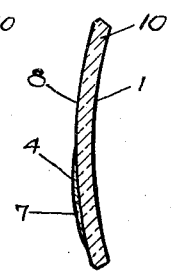
FIG VIII
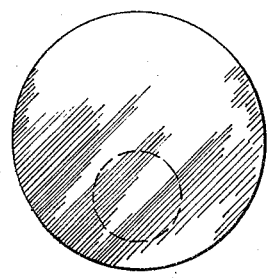
FIG IX
Inventor
ANNA. E. GLANCY
By Harry H. Styll
Attorney Patented Sept. 27, 1932

1,879,800

UNITED STATES PATENT OFFICE

ANNA E. GLANCY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC LENS

Application filed November 30, 1928. Serial No. 322,873.

This invention relates to improvements in ophthalmic lenses and has particular reference to a fused multifocal lens.

The principal object of this invention is to provide a multifocal lens that will have less color aberration than the prior art fused multifocal lens and will be less visible than the prior art one-piece multifocal lens.

Another object of the invention is to reduce the chromatic aberration which exists in fused multifocal lenses.

Another object of the invention is to provide an improved multifocal lens made of two or more pieces of material which possesses some of the advantages of a multifocal lens made from a single piece of material.

Another object of the invention is to provide an improved process for making the aforesaid multifocal lens.

Another object of the invention is to provide simple, efficient and economical means for making a fused multifocal lens with reduced chromatic aberration and which will possess some of the advantages of one-piece and cemented forms of multifocals.

Other objects and advantages of the invention will become apparent from the following description taken in connection with the accompanying drawing, and it will be apparent that many changes may be made in the details of construction and arrangement of parts and steps of the process without departing from the spirit of the invention as expressed in the accompanying claims. I, therefore, do not wish to be limited to the exact details of construction and arrangements shown and described as the preferred forms only have been shown by way of illustration.

Fig. I is a section through a prior art form of fused multifocal lens;

Fig. II is a cross section through the lens of the invention showing one step in the process of manufacture;

Fig. III is a cross section of the lens of the invention showing another step in the process of manufacture;

Fig. IV is a cross section of the lens of the invention showing another step in the process of manufacture;

Fig. V is a front view of a finished lens;

Fig. VI is a view similar to Fig. II showing the segment seat on the opposite side from that shown in Fig. II;

Fig. VII is a view similar to Fig. III, the segment being shown on the opposite side;

Fig. VIII is a view similar to Fig. IV, the segment being shown on the opposite side;

Fig. IX is a face view of the lens shown in Fig. VIII;

Fig. X is a front view of a lens having a straight top segment;

Fig. XI is a cross section through the lens of Fig. X;

Fig. XII is a cross section through the lens of Fig. X showing a step of the process of inserting the segment in the major blank.

In the prior art there have been three forms of multifocal lenses. They were the so-called cement form, in which a button or segment for the reading portion was cemented onto the distance portion; the one-piece form, in which the reading and distance portions were ground at different curvatures on the one face of the lens material; and the fused form, in which a segment of one index of refraction was fused to the distance portion of a different index of refraction. Each of these forms of lenses possessed certain advantages and certain disadvantages. The mobility of the cement form was its great advantage. The segment could be placed in almost any position desired, but being cemented on the cement broke away and cracked forming great color distortions. Its main objection was its inartistic appearance after a short period of wear. Another difficulty was that it was extremely difficult to get a knife edge segment that would not crack out. The one-piece form, scientifically, is probably the best form of lens that could be made, but it is very visible due to the bulge of the stronger reading portion as it rises from its seat on the distance portion; the stronger the power of the bifocal, the more visible it is.

The fused multifocal was very popular because it was practically invisible as the curvature of the distance and reading fields was one continuous curve. There was, however, and particularly in the stronger powers, great trouble due to color dispersions in view of the fact that the glass forming the distance portion had a different coefficient of dispersion from that forming the reading portion.

It is, therefore, the prime object of my invention to retain as far as possible the advantages of all of the prior art forms of multifocals and to eliminate as far as possible the various disadvantages, particularly the hyper-chromatic condition existing in the prior art fused form of multifocal lens. It will be found that in my invention and following the principles herein laid down that I have reduced this hyper-chromatic condition about one-third as compared with the prior art multifocal lens.

Referring to the drawing wherein similar reference characters denote corresponding parts throughout, I first finish on a blank 10 of optical glass the distance curvature 1. Into this distance curvature 1 I next grind the recess 2, the curvature 7 of which is substantially parallel with the curvature 1. Into the recess 2 I next fuse or otherwise secure the segment 3 which has a different index of refraction from the material of the blank 10, the segment being fused to the blank 10 on the line 7. On the outer face of the segment 3 I next grind the curvature 4 to give the desired additional power of the reading portion. It will be noted that the power of the lens through the segment 3 is dependent upon the index of refraction of the segment 3. In Figs. II, III and IV the segment 3 is on the concave side of the blank. The segment can be placed on the convex side if desired, as shown in Figs. VI, VII and VIII. After I have ground or otherwise made the curvatures 1 and 4 on the multifocal side of the blank 10, I next grind and finish the prescription side 8 of the blank to give the required powers to the distance and reading fields.

In making the curvature 1 I use the ordinary grinding, polishing and finishing tools used for grinding single lenticular surfaces in the prior art. I grind the recess 2 to the curvature 7 in a similar way using the regular prior art tools. The segment 3 is finished on one side by ordinary grinding tools to conform to the curvature 7. The segment 3 is then placed in the recess 2 and placed in an electric furnace or other heating device until the segment is fused in the recess 2 in the regular prior art manner of making fused multifocal lenses. The curvature 4 is ground on the segment 3 in the prior art method using preferably ring tool grinding as is usual in the case of the production of one-piece multifocal lenses. The prescription side is ground, finished and polished on the opposite side of the blank with the usual prior art grinding, finishing and polishing tools.

The segment 3 as indicated in Fig. I is of a piece of glass having a different dispersive power from that of the blank 10. The color distortion in this form of lens is very high, particularly in the stronger powers.

Referring to Fig. IV, it will be evident that the shallower the curves 4 and 7, the less color dispersion there will be. The stronger these curves, the more chromatic aberration there will be present. Referring also to Fig. IV, it will be clear that the flatter the curvature 4, the less visible is the multifocal segment 3, from which it will be clear that my lens has less color aberration than the prior art lens shown in Fig. I, and is less visible than the higher, stronger curve one-piece multifocal lenses which have a very bulged curvature 4. It will also be clear that as the segment 3 is fused to the blank 10 the segment 3 cannot become displaced nor the adhesive cracked to form color disturbances as in the case of the prior art cement bifocals.

Referring to Figs. II and III, it will be seen that there is a shoulder between the surface 1 and the surface 7 and that, referring to Fig. IV, this shoulder has disappeared. In the preferred way of making my multifocal lens after I fuse in the segment 3 in the recess 2 I grind down the curvature 1 to eliminate the shoulder between the surfaces 1 and 7 and then grind on the curvature 4 so that the segment 3 blends with the distance field which is a fine knife edge without shoulder or depression.

Of course, it will be apparent that the curve 7 need not be the same curvature as the curve 1 as a useful lens may be made with many different curvatures for the curve 7, but it is equally apparent that the thinner the segment 3 and the flatter the curve 4 and the curve 7, the less chromatic aberration there will be.

The following example is illustrative of the reduction of chromatic aberration in my lens as compared with the prior art fused multifocal lenses. We will place on the face 1 a minus 4 diopter curve of radius minus 130.8 millimeters and a radius of minus 227.5 millimeters on the segment 3 forming the curve 4. These figures refer to the finished curves in Fig. IV and are arrived at as follows:

The index of refraction for the well known crown glass taken with reference to the standard lines as used for the measurement of refractive indices is:

$C$ Line, 1.5206, $D$ Line, 1.5232, $F$ Line, 1.5294.

The index of refraction for the flint glass taken with reference to the same standard lines is:

$C$ Line, 1.6117, $D$ Line, 1.6165, $F$ Line, 1.6286.

Now, let $W_c$ be the dispersive power of the crown glass and $W_f$ the dispersive power for the flint glass.
Then $W_c$ equals $\dfrac{1.5294 - 1.5206}{0.5232}$ equals 0.0168.

$W_f$ equals $\dfrac{1.6286 - 1.6117}{0.6165}$ equals 0.0274.

By dispersive power is meant the difference between the indices of refraction for the $C$ line and the $F$ line divided by the index for the $D$ line minus unity.

Let $D_c$ be the power of a crown button. Let $D_f$ be the power of a flint button.

The chromatic aberration of a lens is often written $W D$ (where $D$ is the power of the lens).

Hence the chromatic aberration of a crown button would be $W_c D_c$, and the chromatic aberration of a flint button would be $W_f D_f$. Therefore, the hyper-chromatic aberration in the reading portion is, Fig. I, $W_f D_f$ minus $W_c D_c$ equals $W_f (D_f$ minus $D_c)$ plus $(W_f$ minus $W_c) D_c$ equals $W_f$ Addition plus $(W_f$ minus $W_c) D_c$; and for Fig. IV, $W_f$ Addition. Hence in Fig. IV the hyper-chromatic aberration is less by the amount $(W_f$ minus $W_c) D_c$ equals $(0.0274$ minus $0.0168) D_c$ equals $0.0106 D_c$. There is no restriction regarding which side of the lens shall bear the button.

The following examples illustrate both cases numerically. We will use for example a plus 2 diopter sphere with an addition of 2 diopters.

In Fig. I is illustrated a lens in which a flint button is fused in a countersink in the crown blank. The power of the crown button which was removed from the crown blank to accommodate the flint button is plus 11.21 diopters.

The power of a flint button of the same dimension is plus 13.21 diopters. The hyper-chromatic aberration of the lens using the flint button is $0.0274 \times 13.21$ minus $0.0168 \times 11.21$ equals 0.174 diopters.

In Fig. IV we have the same prescription in the improved form. The power of the flint button is plus 2 diopters. The hyper-chromatic aberration is $0.0274 \times 2$ equals 0.055 diopters, or five-hundredths as against 0.17 diopters for the prior art form, or about one-third.

From this it is evident that the hyper-chromatic aberration of the improved type of lens in the examples given is less than one-third that of the usual type taken as a comparison and this ratio holds substantially true throughout the usual range of powers of lenses.

If desired a straight top segment as indicated in Fig. X may be used. The major blank 10 is made of crown glass and has the recess 2 with the bottom of the recess 7 substantially parallel with the surface 1. In this modification the segment 3 instead of being made of one piece of glass is made of two pieces of glass as shown in Fig. XII.

The upper portion of the glass is of crown glass identical with the glass of the blank 10, this crown glass being indicated by the numeral 14. The lower portion of the glass 15 is of different glass from that of the blank 10, being of flint glass. The dividing line 16 between the portions 14 and 15 forms the top line of the segment. It is clear that when the combined segment 3 is fused into the major blank 10 the portion 14 being of the same material as the blank 10 will blend with it and be invisible, whereas the portion 15 being of different material will show the line 16 and the lower boundary line of the segment. This straight top shape of segment has been found to be highly efficient and made in this way produces this type of segment to much better advantage than can be produced in any other way, as it is much thinner than in the usual fused forms and the shoulder at the line 16 is much smaller than in previous prior art forms of fused bifocals. The line 16 is the most objectionable feature of this type of segment as in some positions it forms an angle of total reflection, giving a mirror like appearance and effect. It is clear, therefore, that the thinner the segment is made at the point 16, the less interference and dispersion of light is caused thereby.

As previously specified, the kinds of glass to be united can only be suitable as regards fusing properties, index of refraction and dispersive power, and the segment may be placed either on the concave or the convex side of the blank as desired.

From the foregoing description it will be seen that I have provided simple, efficient and economical means for obtaining all the advantages of the invention and particularly those of the neat appearance of the one-piece form with reduced chromatic aberration of the fused forms.

Having described my invention, I claim:

1. The process of forming a multifocal or bifocal lens comprising forming a countersink in a major portion of lens medium of one index of refraction, securing a segment of lens medium of a different index of refraction in the countersink, surfacing the exposed face of the major portion on the countersink side to substantially the same depth as that of the countersink and to a curve blending with that of the bottom of the countersink and of substantially the same radius to form a substantially continuous unbroken curve over the exposed and unexposed surfaces on the countersink side of the lens and surfacing a curve of a different radius on the exposed face of the segment to produce the power desired through said segment.

2. The process of forming a multifocal lens or bifocal lens comprising forming a countersink in a major portion of lens medium of one index of refraction, fusing a segment of lens medium of a different index of refraction in the countersink, surfacing the exposed face of the major portion on the countersink side to substantially the same depth as that of the countersink curve and to a curve blending with the countersink curve to form a substantially continuous curve over the exposed and unexposed surfaces on the countersink side of the lens and surfacing a curve of a different radius on the exposed face of the segment to produce the power desired through the segment.

3. The process of forming a multifocal or bifocal lens comprising forming a countersink in a major portion of lens medium, said countersink having a curved bottom of substantially the same radius as that of a calculated curve to be formed on the major portion of the countersink side of the lens, fusing a segment of lens medium of a different index of refraction in the countersink, surfacing the exposed face of the major portion on the countersink side to substantially the same depth as that of the countersink curve to form a substantially continuous unbroken curve over the exposed and unexposed surfaces on the countersink side of the lens and surfacing a curve of a different radius on the exposed face of the segment to produce the power desired through the segment.

4. The process of forming a multifocal or bifocal lens comprising forming a shouldered supporting countersink in a major portion of lens medium, said countersink having a curved bottom of substantially the same radius as that of a calculated curve to be placed on the distance portion of the lens on the countersink side thereof, fusing a segment of a different index of refraction in the countersink, surfacing the distance portion of the lens to a curve of substantially the same radius as that on the bottom of the countersink and to substantially the same depth thereof to remove the shoulder of the countersink and surfacing the exposed face of the segment with a curve of a different radius to produce a substantially feathered edge segment of the power desired.

ANNA E. GLANCY.